(12) United States Patent
Miller

(10) Patent No.: US 9,598,903 B2
(45) Date of Patent: Mar. 21, 2017

(54) APPARATUS FOR MOUNTING AN X-RAY DEVICE ON A LADDER

(71) Applicant: Honeywell Federal Manufacturing & Technologies, LLC, Kansas City, MO (US)

(72) Inventor: Richard Dean Miller, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 59 days.

(21) Appl. No.: 14/581,400

(22) Filed: Dec. 23, 2014

(65) Prior Publication Data

US 2016/0177626 A1  Jun. 23, 2016

(51) Int. Cl.
*E06C 7/14* (2006.01)
*G03B 17/56* (2006.01)
*F16M 13/02* (2006.01)

(52) U.S. Cl.
CPC .............. *E06C 7/14* (2013.01); *F16M 13/02* (2013.01); *G03B 17/561* (2013.01)

(58) Field of Classification Search
CPC .......... G03B 17/561; E06C 7/14; F16M 13/02
USPC .......................................... 396/419; 248/238
See application file for complete search history.

(56) References Cited

U.S. PATENT DOCUMENTS

| | | | |
|---|---|---|---|
| 3,146,984 A * | 9/1964 | Matthews | F16M 11/18 248/178.1 |
| 5,031,723 A | 7/1991 | Hooten | |
| 5,060,755 A * | 10/1991 | Bourdages | E06C 7/16 182/121 |
| 5,975,240 A | 11/1999 | O'Brien | |
| 6,109,392 A * | 8/2000 | Merrick | E06C 7/16 182/121 |
| 6,244,548 B1 | 6/2001 | Gillette | |
| 2011/0219988 A1* | 9/2011 | Stephens | A47B 9/00 108/6 |
| 2012/0138763 A1 | 6/2012 | Russell | |
| 2012/0187266 A1 | 7/2012 | Schirmacher | |

FOREIGN PATENT DOCUMENTS

CA        2543960        5/2005
WO    WO2005/094349    10/2005

* cited by examiner

*Primary Examiner* — Rochelle-Ann J Blackman
(74) *Attorney, Agent, or Firm* — Hovey Williams LLP

(57) ABSTRACT

An apparatus for mounting an X-ray device or other electronic device, or a PAN disrupter or other mechanical device onto a ladder, the apparatus broadly comprising a horizontally extending mounting plate, a horizontally extending engagement bracket, a vertically extending mounting plate, and a hinge. The horizontally extending mounting bracket and the horizontally extending engagement bracket each include a rung engagement tab. The horizontally extending engagement bracket is slidable in relation to the horizontally extending mounting bracket for securing the apparatus to a ladder rung via the rung engagement tabs. The horizontally extending mounting plate stabilizes the electronic or mechanical device via the ladder rung and the vertically extending mounting plate supports the weight of the electronic or mechanical device on a lower ladder rung. The hinge pivotably connects the horizontally extending mounting plate and the vertically extending mounting plate.

20 Claims, 4 Drawing Sheets

APPARATUS FOR MOUNTING AN X-RAY DEVICE ON A LADDER

BACKGROUND

The present invention relates to apparatuses for mounting electronic and mechanical devices on ladders.

Electronic devices such as X-ray devices, cameras, video equipment, and other electronic equipment often must be mounted high or in specific locations to obtain desired images or other signals. The electronic devices may be mounted on walls, ceilings, or other permanent structures at the required height. Where no permanent structures are nearby, the devices are often mounted on portable tripods or makeshift structures. The portable tripods and makeshift structures often are not sturdy or rigid, which makes the images or signals obtained by the devices blurry, shaky, or otherwise unusable. Tripods may also not fit into the desired location. Additionally, mechanical devices such as Percussion-Actuated Non-electric (PAN) devices require very precise positioning. Ladders are known to be readily available, to fit into many locations, and to be sufficiently sturdy for mounting most electronic and mechanical devices. Many people have used ladder accessories such as ladder paint trays and tool tray attachments for attaching electronic and mechanical devices to ladders. However, the ladder accessories are not very sturdy because they are intended to merely support paint cans or inexpensive tools. Moreover, the ladder accessories are not designed to rigidly attach to the ladders because simply supporting or holding the tools is sufficient.

SUMMARY

The present invention solves the above-described problems and provides a distinct advance in the art of mounting apparatuses for electronic and mechanical devices. More particularly, the present invention provides an apparatus for mounting an X-ray device, a camera, video equipment, or another electronic device, a PAN device, or another mechanical device to a ladder.

An embodiment of the mounting apparatus broadly comprises a horizontally extending mounting plate, a horizontally extending engagement bracket, a vertically extending mounting plate, and a hinge.

The horizontally extending mounting plate stabilizes the electronic or mechanical device and is a substantially flat plate having an angled front edge, a first device mounting point, a first handle slot, one or more engagement bracket fastener slots, and a first rung engagement tab.

The first device mounting point may be positioned near a front corner of the horizontally extending mounting plate for mounting the electronic or mechanical device thereon so as to provide an optimal vantage point for the electronic or mechanical device.

The first handle slot provides a hand-gripping area for grasping and carrying the mounting apparatus.

The engagement bracket fastener slots extend longitudinally along the horizontally extending mounting plate and allow the horizontally extending engagement bracket to be adjusted.

The first rung engagement tab extends downward from the horizontally extending mounting plate for engaging a front side of a ladder rung of the ladder. The first rung engagement tab includes a laterally extending horizontally extending engagement bracket slot for receiving the horizontally extending engagement bracket therein.

The horizontally extending engagement bracket is positioned in the horizontally extending engagement bracket slot and includes a horizontally extending portion and a second rung engagement tab.

The horizontally extending portion includes engagement bracket fastener studs for securing the horizontally extending engagement bracket to the horizontally extending mounting plate via engagement bracket fasteners.

The second rung engagement tab extends downward from the rear edge of the horizontally extending portion and engages the back side of the ladder rung when the mounting apparatus is attached to the ladder rung.

The vertically extending mounting plate supports weight of the electronic or mechanical device and is a substantially flat plate having an angled front edge, a second device mounting point, a second handle slot, and one or more ladder engagement protrusions.

The second device mounting point may be positioned near a front corner of the vertically extending mounting plate for mounting the electronic or mechanical device thereon so as to provide an optimal vantage point for the electronic or mechanical device.

The second handle slot provides a hand-gripping area for grasping and carrying the mounting apparatus. The first and second handle slots are cooperatively positioned to align with each other when the mounting apparatus is in a folded configuration.

The ladder engagement protrusions extend downward from a bottom of the vertically extending mounting bracket for engaging a lower ladder rung when the apparatus is in a deployed configuration.

The hinge pivotally connects the horizontally extending mounting plate and the vertically extending mounting plate together along a side edge of the horizontally extending mounting plate and a top edge of the vertically extending mounting plate. The hinge allows the vertically extending mounting plate to be pivoted from approximately 90 degrees in relation to the horizontally extending mounting plate to substantially parallel to the horizontally extending mounting plate so that the mounting apparatus may be shifted between deployed and folded configurations.

The mounting apparatus may be attached to the ladder by angling the mounting apparatus upward, hooking the horizontally extending mounting plate over the ladder rung, rotating the mounting apparatus downward so that the first rung engagement tab engages the front side of the ladder rung, and pivoting the vertically extending mounting plate downward to approximately 90 degrees in relation to the horizontally extending mounting plate so that the mounting apparatus is in the deployed configuration and the ladder engagement protrusions engage the lower ladder rung. The electronic or mechanical device may then be attached to the mounting apparatus by tightening mounting feet of the electronic or mechanical device onto the device mounting points.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
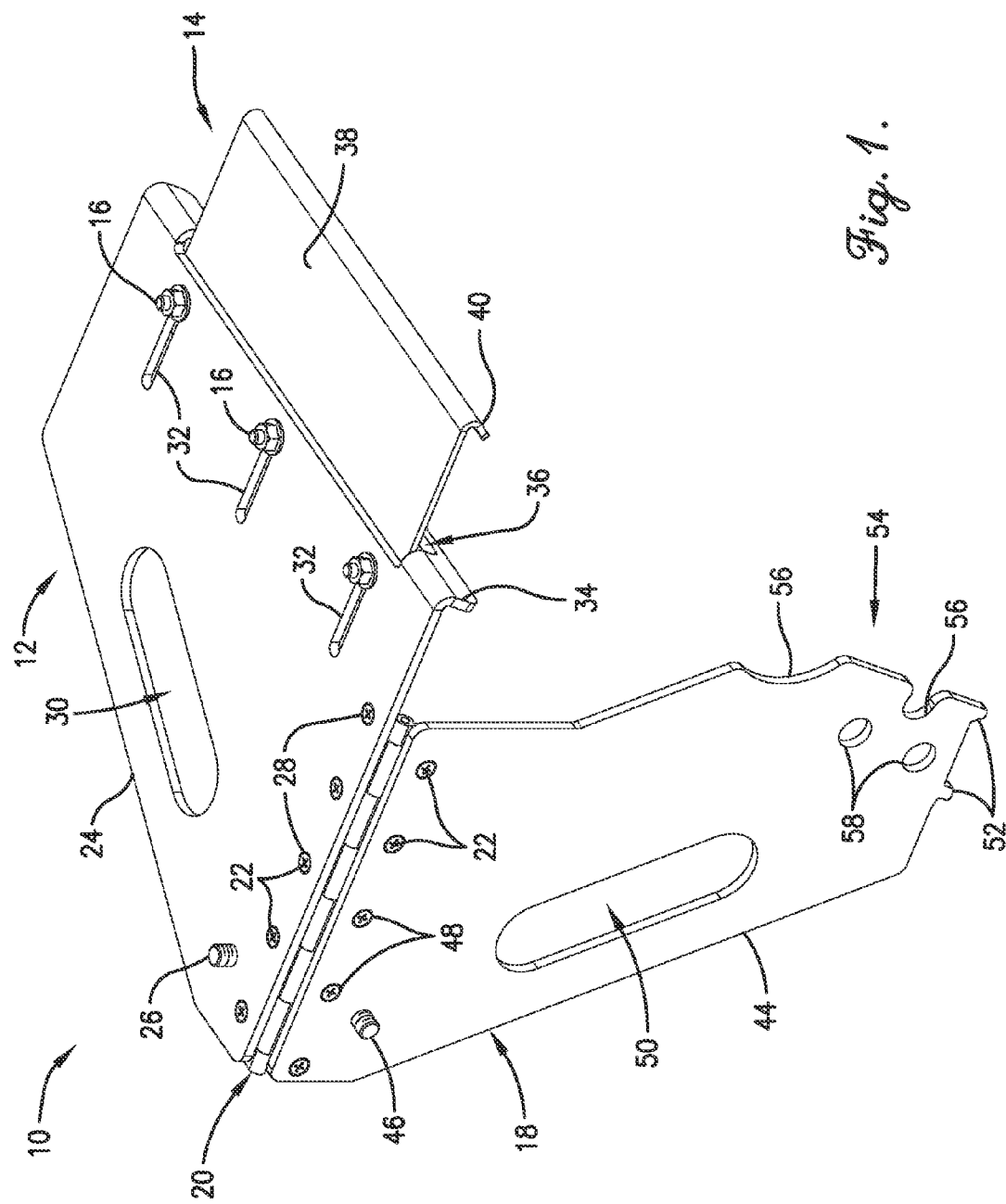
FIG. 1 is a perspective view of a mounting apparatus constructed in accordance with an embodiment of the present invention with the mounting apparatus in a deployed configuration.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, an apparatus 10 for mounting an X-ray device, a camera, video equipment, or other electronic equipment, a PAN disrupter, or other mechanical equipment on a ladder constructed in accordance with an embodiment of the present invention is illustrated. The mounting apparatus 10 broadly comprises a horizontally extending mounting plate 12, a horizontally extending engagement bracket 14, a number of engagement bracket fasteners 16, a vertically extending mounting plate 18, a hinge 20, and a number of hinge fasteners 22.

The horizontally extending mounting plate 12 stabilizes the electronic or mechanical device on a horizontal rung of the ladder and may be formed of aluminum, steel, or titanium sheet metal, machined metal, or cast metal, molded plastic, or any other suitable material. The horizontally extending mounting plate 12 may be a substantially flat plate having an angled front edge 24 and may include a device mounting point 26, a number of hinge mounting holes 28, a first large handle slot 30, a number of engagement bracket fastener slots 32, and a first rung engagement tab 34.

The device mounting point 26 receives a corresponding mounting foot of the electronic or mechanical device thereon and may be a small nub-like or threaded protrusion, a smooth or threaded recess, a mounting hole, a clip, a snap, or other suitable mounting structure. In one embodiment, the device mounting point 26 may be a standard ⅜"-16 threaded camera stud pressed into the horizontally extending mounting plate 12. The device mounting point 26 may be positioned near a front corner of the horizontally extending mounting plate 12 for providing an optimal vantage point for the electronic or mechanical device.

The hinge mounting holes 28 receive the hinge fasteners 22 therein for connecting the hinge 20 to the horizontally extending mounting plate 12 and may be spaced evenly in a row near an elongated side of the horizontally extending mounting plate 12.

The first large handle slot 30 provides a place for a user to grab and/or carry the mounting apparatus 10 and may be an elongated slot extending parallel to the angled front edge 24 of the horizontally extending mounting plate 12.

The engagement bracket fastener slots 32 receive the engagement bracket fasteners 16 therein and allow the horizontally extending engagement bracket 14 to be attached to the horizontally extending mounting plate 12 at a desired offset distance, as described below. The engagement bracket fastener slots 32 are elongated and extend longitudinally towards the first rung engagement tab 34. In one embodiment, the engagement bracket fastener slots 32 include three slots aligned in a row parallel to the first rung engagement tab 34 and spaced equidistant from each other.

The first rung engagement tab 34 engages a front side of a ladder rung and extends downward from the back of the horizontally extending mounting plate 12. The first rung engagement tab 34 may be angled at 90 degrees from horizontal or may be angled at between 45 and 90 degrees or between 90 and 135 degrees from horizontal depending on the angle of the front side of the ladder rung. The first rung engagement tab 34 may include an engagement bracket slot 36 for receiving the horizontally extending engagement bracket 14 therethrough. The engagement bracket slot 36 extends laterally along the first rung engagement tab 34 and may be positioned just below the bottom surface of the horizontally extending mounting plate 12 so that the top of the horizontally extending engagement bracket 14 may be adjacent to the bottom surface of the horizontally extending mounting plate 12 when the horizontally extending engagement bracket 14 is positioned in the engagement bracket slot 36, as described in more detail below.

The horizontally extending engagement bracket 14 engages a ladder rung and may be formed of a similar material as the horizontally extending mounting plate 12. The horizontally extending engagement bracket 14 includes a horizontal portion 38 and a second rung engagement tab 40. The horizontal portion 38 allows the horizontally extending engagement bracket 14 to be attached to the horizontally extending mounting plate 12 and includes a number of engagement fastener bracket studs 42 or other fasteners for receiving the engagement bracket fasteners 16 thereon. The engagement bracket fastener studs 42 are spaced to align with the engagement bracket fastener slots 32 of the horizontally extending mounting plate 12. The second rung engagement tab 40 engages the back side of the ladder rung and extends downward from the back of the horizontally extending engagement bracket 14. The second rung engagement tab 40 may be angled at 90 degrees from horizontal or may be angled between 45 degrees and 90 degrees or between 90 degrees and 135 degrees depending on the angle of the back side of the ladder rung. The second rung engagement tab 40 and the first rung engagement tab 34 may be angled so that they form a positive grip on the ladder rung when the mounting apparatus 10 is attached to the ladder, as described in more detail below.

The engagement bracket fasteners 16 secure the horizontally extending engagement bracket 14 to the horizontally extending mounting plate 12 and may include nuts and washers, pins, clamps, or other fasteners for tightening onto the engagement bracket fastener studs 42 of the horizontally extending engagement bracket 14.

The vertically extending mounting plate 18 supports the weight of the electronic or mechanical device and may be a substantially flat plate with an angled front edge 44. The vertically extending mounting plate 18 may include a device mounting point 46, a number of hinge mounting holes 48, a second large handle slot 50, one or more ladder engagement protrusions 52, and one or more clearance holes and/or clearance contours 54.

The device mounting point 46 receives a corresponding mounting foot of the electronic or mechanical device thereon and may be a small nub-like or threaded protrusion, a smooth or threaded recess, a mounting hole, a clip, a snap, or other similar mounting structure. In one embodiment, the device mounting point 46 may be a standard 3/8"-16 threaded camera stud pressed into the vertically extending mounting plate 18. The device mounting point 46 may be positioned near a front corner of the vertically extending mounting plate 18 (close to the device mounting point 26 of the horizontally extending mounting plate 12) for providing an optimal vantage point for the electronic or mechanical device.

The hinge mounting holes 48 receive the hinge fasteners 22 therein for connecting the hinge 20 to the vertically extending mounting plate 18 and may be spaced evenly in a row near an elongated side of the vertically extending mounting plate 18.

The second large handle slot 50 provides a place for a user to grab and/or carry the mounting apparatus 10 and may be an elongated slot extending parallel to the angled front edge 44 of the vertically extending mounting plate 18. The second large handle slot 50 is substantially similar to the first large handle slot 30. The first and second large handle slots 30, 50 are cooperatively positioned such that the first and second large handle slots 30, 50 are aligned together when the mounting apparatus 10 is in the folded configuration, as described below.

The ladder engagement protrusions 52 engage grooves, contours, or sides of a lower ladder rung and may be small nub-like protrusions, bosses, or similar geometry. The ladder engagement protrusions 52 extend from the bottom of the vertically extending mounting plate 18 and are spaced apart from each other to engage the lower ladder rung.

The clearance holes and clearance contours 54 receive various structures of the ladder therein so that the vertically extending mounting plate 18 may be positioned against a vertical rail of the ladder. For example, some ladders may include rivets, hinges, and/or structural features that extend inward from the vertical rails. The clearance holes and contours 54 provide spaces for the rivets, hinges, and/or structural features when the vertically extending mounting plate 18 is positioned against the vertical rail of the ladder. In one embodiment, the vertically extending mounting plate 18 includes two concave clearance contours 56 and at least two circular openings 58 for accommodating a hinge and rivets of the ladder.

Figure 2:
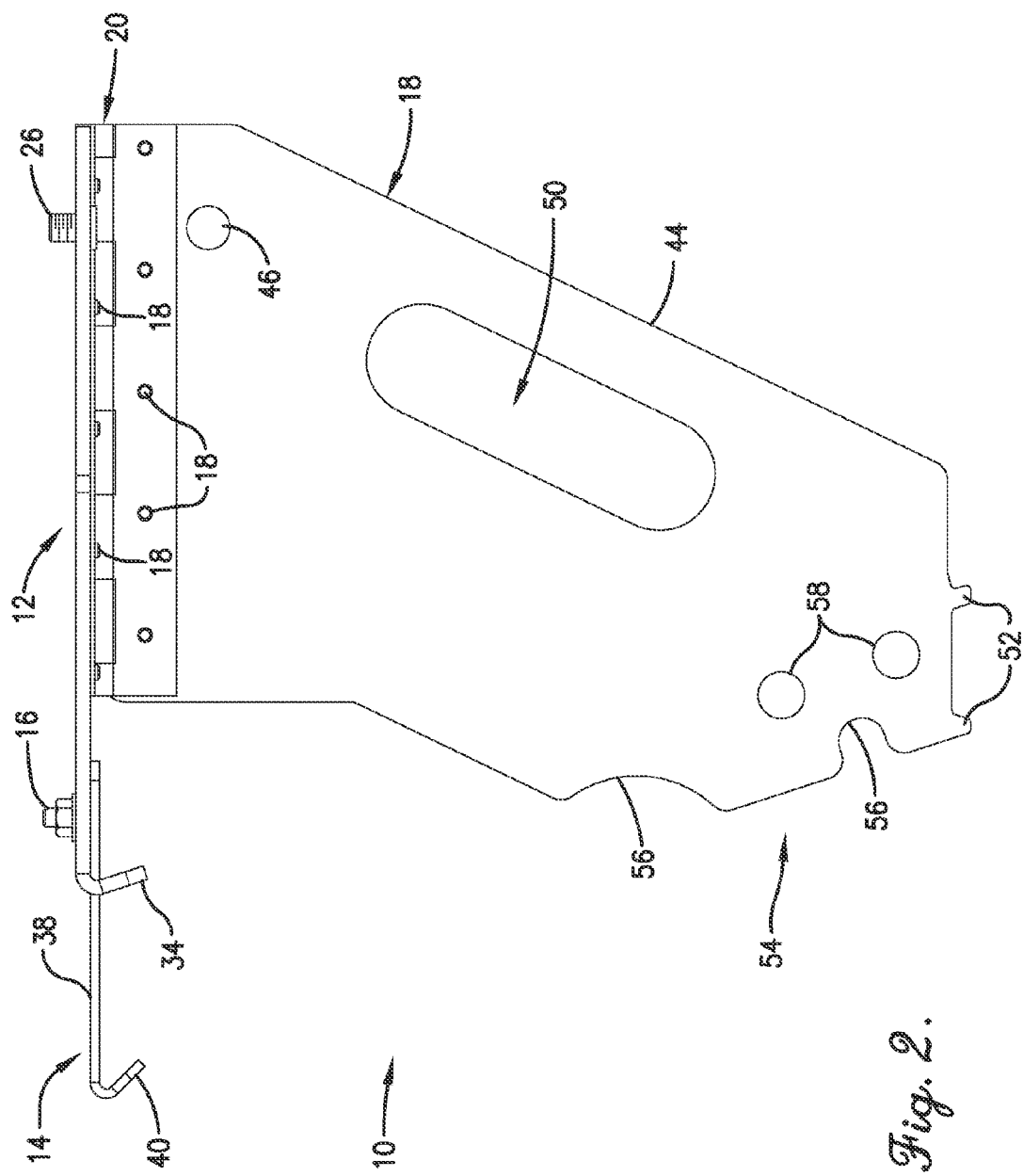
FIG. 2 is a side elevation view of the mounting apparatus of FIG. 1.
Figure 3:
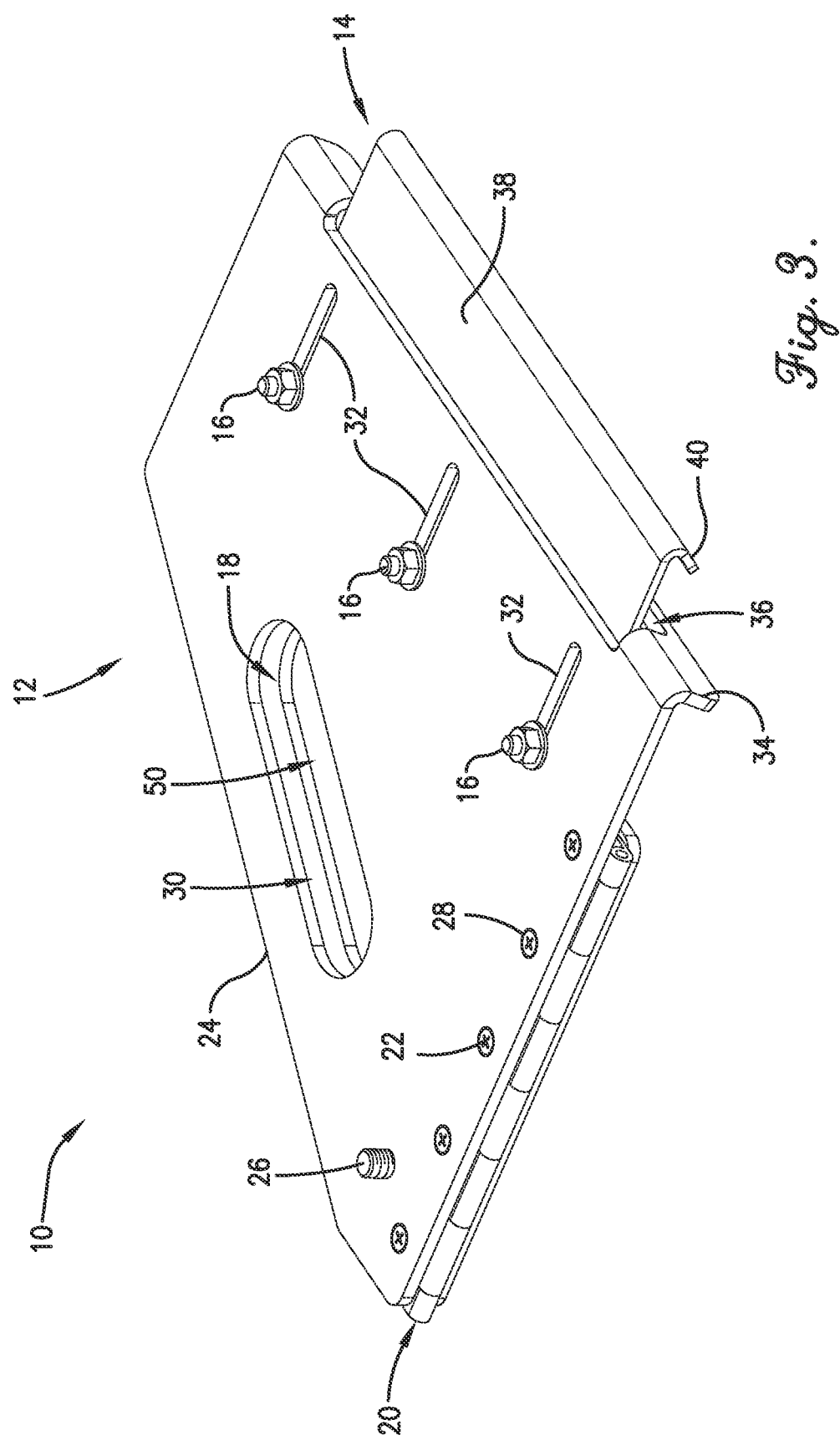
FIG. 3 is a perspective view of the mounting apparatus of FIG. 1 with the mounting apparatus in a folded configuration.
Figure 4:
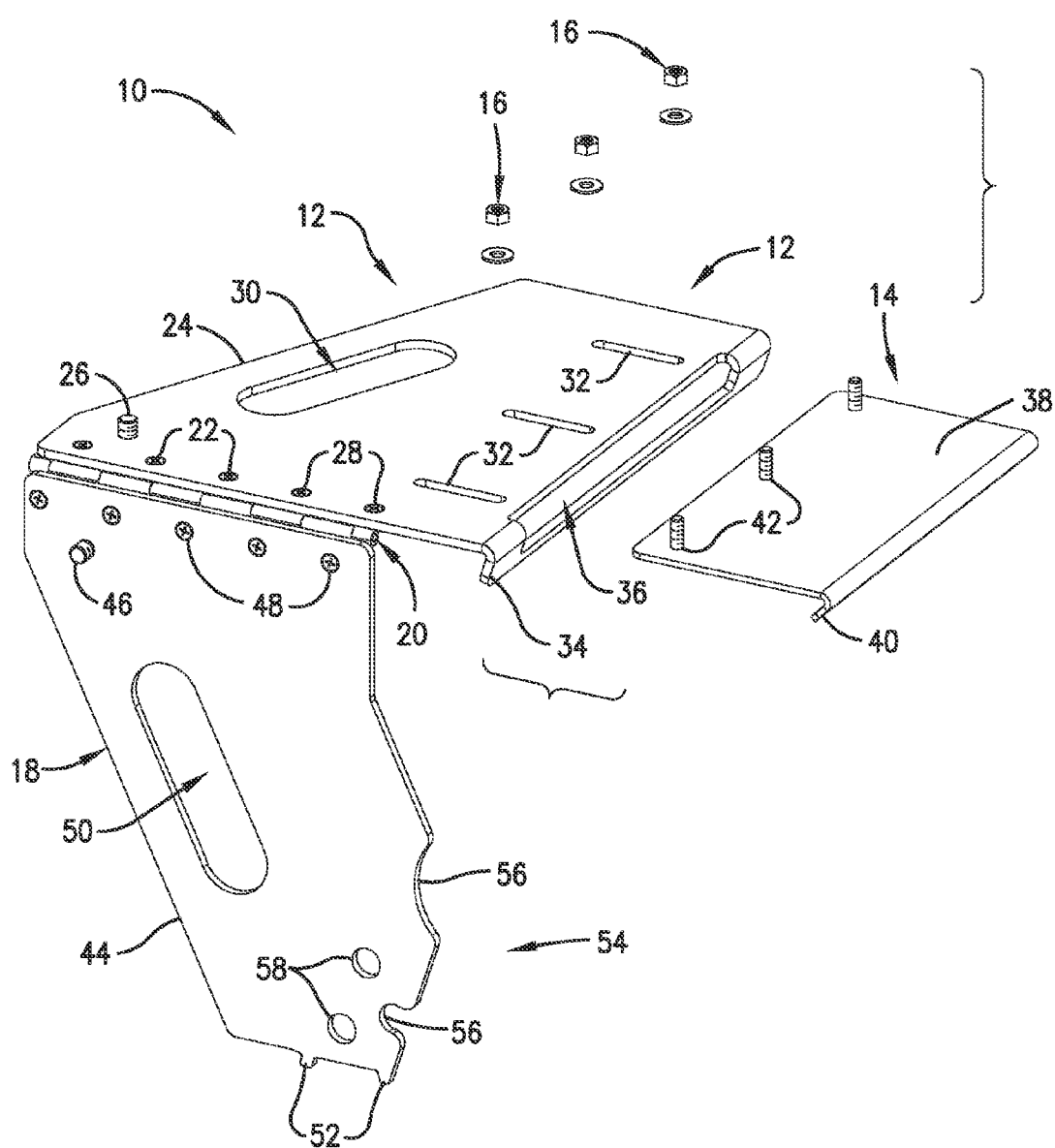
FIG. 4 is an exploded assembly view of the mounting apparatus of FIG. 1.

The hinge 20 pivotably attaches the horizontally extending mounting plate 12 to the vertically extending mounting plate 18 at a long side edge of the horizontal mounting plate and a long top edge of the vertically extending mounting plate 18. The hinge 20 may be a piano hinge or may include a number of butterfly-style hinges or similar hinges spaced from each other. The hinge 20 allows the horizontally extending mounting plate 12 and the vertically extending mounting plate 18 to be pivoted with respect to each other so that the mounting apparatus 10 can be shifted between a deployed configuration (FIGS. 1 and 2) and a folded configuration (FIG. 3), as described in more detail below.

The hinge fasteners 22 secure the hinge 20 to the horizontally extending mounting plate 12 and the vertically extending mounting plate 18 and may include bolts with nuts and washers, pins, rivets, clamps, or other fasteners.

Use of the above-described mounting apparatus 10 will now be described in more detail. First, the horizontally extending engagement bracket 14 may be adjusted for properly fitting the mounting apparatus 10 onto the ladder. The engagement bracket fasteners 16 may be loosened and the horizontally extending engagement bracket 14 is slid at least partially out from the engagement bracket slot 36 so that the first and second rung engagement tabs 34, 40 are separated from each other. The engagement bracket fasteners 16 do not need to be completely removed because the engagement bracket fastener slots 32 allow the engagement bracket fastener studs 42 and the horizontally extending engagement bracket 14 to be slid outward a sufficient distance. The mounting apparatus 10 may then be positioned on the ladder so that the first rung engagement tab 34 of the horizontally extending mounting plate 12 engages the rung of the ladder and the horizontally extending engagement bracket 14 extends over the ladder rung. The horizontally extending engagement bracket 14 may then be slid into the engagement bracket slot 36 until the second rung engagement tab 40 engages the back side of the ladder rung. The engagement bracket fasteners 16 may then be tightened so that the horizontally extending engagement bracket 14 is secured to the horizontally extending mounting plate 12. The first and second rung engagement tabs 34, 40 will cooperatively form a positive grip on the ladder rung due to their converging orientation. The mounting apparatus 10 may then be removed from the ladder rung (as described below) and is now ready for future use.

The mounting apparatus 10 may be quickly mounted onto the ladder rung by tilting the mounting apparatus 10 upward and positioning the horizontally extending mounting plate 12 over the ladder rung so that the second rung engagement tab 40 engages the back side of the ladder rung. The mounting apparatus 10 may then be rotated downward until the first rung engagement tab 34 engages the front side of the ladder rung. The vertically extending mounting plate 18 may then be pivoted relative to the horizontally extending mounting plate 12 via the hinge 20 so as to shift the mounting apparatus 10 from the folded configuration to the deployed configuration. When the mounting apparatus 10 is in the deployed configuration, the vertically extending mounting plate 18 may be oriented approximately 90 degrees in relation to the horizontal mounting plate 22 or in some cases slightly more than 90 degrees to bias the mounting apparatus 10 in the deployed configuration. The ladder engagement protrusions 52 may be positioned in a groove or against the sides of a lower ladder rung and will prevent the vertically extending mounting plate 18 from moving forwards or backwards. The electronic or mechanical device may then be mounted onto the mounting apparatus 10 via the device mounting points 26, 46.

The mounting apparatus 10 may be dismounted from the ladder for storage or transportation as follows: first, the electronic or mechanical device is removed from the device mounting points 26, 46. Then, the vertically extending mounting plate 18 is pivoted relative to the horizontally extending mounting plate 12 so that the ladder engagement protrusions 52 no longer engage the lower ladder rung and so that the mounting apparatus 10 is shifted to the folded configuration. The mounting apparatus 10 may then be tilted upward until the first rung engagement tab 34 disengages from the front side of the ladder rung. The mounting apparatus may then be lifted off of the ladder rung.

The first and second large handle slots 30, 50 are aligned with each other when the mounting apparatus 10 is in the folded configuration so that the mounting apparatus 10 can then be carried by inserting one's fingers through the first and second large handle slots 30, 50 and grasping the horizontally extending mounting plate 12 and the vertically extending mounting plate 18.

The above-described mounting apparatus 10 provides many advantages over the prior art. For example, the vertically extending mounting plate 18 is connected to a side of the horizontally extending mounting plate 12 and extends longitudinally when the mounting apparatus 10 is in the deployed configuration. This ensures a more stable mounting structure for supporting the electronic or mechanical device because the vertically extending mounting plate 18 is aligned directly underneath the weight of the electronic or mechanical device and because the horizontally extending mounting plate 12, the vertically extending mounting plate 18, and the ladder form a triangular or "3-point" structure. This triangular structure is sturdier and more rigid than rectangular or "4-point" structures created by ladder mounting devices of the prior art. The horizontally extending engagement bracket 14 slides in and out in relation to the horizontally extending engagement bracket 14, which allows the mounting apparatus 10 to be adjusted for connecting to ladders and other structures of different sizes and shapes. The first and second rung engagement tabs 34, 40 are angled inward with respect to each other, which creates a positive grip on the ladder rung. This ensures that the mounting apparatus 10 will not become accidentally dislodged from the ladder. The clearance holes and contours 54 ensure that the mounting apparatus 10 is properly mounted and properly supports the weight of the electronic or mechanical device and allow the mounting apparatus 10 to be used on a larger number of ladders. The mounting apparatus 10 also allows the electronic or mechanical device to extend or be positioned laterally from the ladder so that the electronic or mechanical device can be aimed downward or beyond the ladder. For example, the ladder may be set up in an A-frame configuration near a parapet wall with the electronic or mechanical device aiming down over the parapet wall. As another example, the ladder may be folded up and leaning against a wall near a window with the electronic or mechanical device aiming through the window. The mounting apparatus 10 may be quickly removed from a ladder by simply folding the mounting apparatus 10 via the hinge 20 and tilting the mounting apparatus 10 upwards. Similarly, the mounting apparatus 10 may be quickly mounted onto another ladder or another rung of the same ladder by simply tilting the mounting apparatus 10 upwards, hooking the mounting apparatus 10 on the ladder rung, and unfolding the mounting apparatus 10 via the hinge 20. This is important for time-sensitive situations such as mounting a PAN diffuser for diffusing a bomb. The mounting apparatus 10 folds substantially flat for being transported, carried, or stored. The large handle slots 30, 50 reduce the overall weight of the mounting apparatus 10 and allow the mounting apparatus 10 to be easily carried in one hand. It will be understood that the mounting apparatus 10 also may support a camera, video equipment, or any other electronic equipment, a PAN disrupter, or any other mechanical device.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An apparatus for mounting an electronic device or mechanical device on a ladder, the apparatus comprising:
   a horizontally extending mounting plate comprising:
      a first electronic device or mechanical device mounting point;
      one or more engagement bracket fastener slots extending longitudinally along the horizontally extending mounting plate; and
      a first rung engagement tab for engaging a front side of a rung of the ladder, the first rung engagement tab including a laterally extending engagement bracket slot;
   a horizontally extending engagement bracket including a horizontally extending portion and a second rung engagement tab, the horizontally extending portion including one or more engagement bracket fasteners and being configured to be inserted into the laterally extending engagement bracket slot, the second rung engagement tab being configured to engage a back side of the ladder rung when the horizontally extending engagement bracket is secured to the horizontally extending mounting plate, the one or more engagement bracket fasteners being configured to be inserted through the one or more engagement bracket fastener slots of the horizontally extending mounting plate for securing the horizontally extending engagement bracket to the horizontally extending mounting plate;
   a vertically extending mounting plate comprising:
      a second electronic device or mechanical device mounting point;
      one or more ladder engagement protrusions for engaging a lower rung of the ladder; and
   a hinge attached to the horizontally extending mounting plate and the vertically extending mounting plate such that the horizontally extending mounting plate and the vertically extending mounting plate may be pivoted with respect to each other so that the apparatus may be shifted between a deployed configuration and a folded configuration, the horizontally extending mounting plate being oriented approximately 90 degrees in relation to the horizontally extending mounting plate and the apparatus being configured to be secured to the ladder in the deployed configuration such that the first engagement tab of the horizontally extending mounting plate engages the front surface of the ladder rung, the second engagement tab of the horizontally extending engagement bracket engages the rear surface of the ladder rung, and the ladder engagement protrusions of the vertically extending mounting plate engage the lower ladder rung, the vertically extending mounting plate and the horizontally extending mounting plate being oriented substantially parallel to each other in the folded configuration for compactly transporting or storing the apparatus.

2. The apparatus of claim 1, wherein the vertically extending mounting plate is connected to the horizontally extending mounting plate along a side edge of the horizontally extending mounting plate via the hinge.

3. The apparatus of claim 1, wherein the first and second rung engagement tabs converge towards each other for forming a positive grip on the ladder rung when the horizontally extending engagement bracket is secured to the horizontally extending mounting plate.

4. The apparatus of claim 3, wherein the second rung engagement tab is more acutely angled from horizontal than the first rung engagement tab so that the apparatus may be hooked onto the ladder rung.

5. The apparatus of claim 4, wherein the first rung engagement tab is angled 72 degrees downward from parallel and the second rung engagement tab is angled 45 degrees downward from parallel.

6. The apparatus of claim 1, wherein the one or more engagement bracket fastener slots includes three slots extending parallel to each other and spaced equidistant from each other.

7. The apparatus of claim 1, wherein the engagement bracket slot is positioned so that the horizontally extending engagement bracket may be secured adjacent the bottom of the horizontally extending mounting plate when the horizontally extending engagement bracket is positioned in the engagement bracket slot.

8. The apparatus of claim 1, wherein the vertically extending mounting plate includes one or more openings and contours for receiving features of a rail of the ladder therein.

9. The apparatus of claim 8, wherein the openings and contours include two concave contours positioned along an edge of the vertically extending mounting plate and two openings positioned near the concave contours.

10. The apparatus of claim 1, wherein the first mounting point is positioned near a front corner of the horizontally extending mounting plate and the second mounting point is positioned near a front corner of the vertically extending mounting plate such that the vertically extending mounting plate supports weight of the electronic device or mechanical device and the horizontally extending mounting plate stabilizes the electronic device or mechanical device, the first mounting point and the second mounting point being configured to provide an optimal vantage point for the electronic device or mechanical device.

11. The apparatus of claim 10, wherein the mounting points allow the electronic or mechanical device to be aimed beyond an outer side of the ladder or downward past the outer side of the ladder.

12. The apparatus of claim 1, wherein the horizontally extending mounting plate and the vertically extending mounting plate each include an angled front edge.

13. The apparatus of claim 1, wherein the horizontally extending mounting plate includes a first handle slot and the vertically extending mounting plate includes a second handle slot, the first and second handle slots being cooperatively positioned so as to be aligned with each other when the apparatus is shifted to the folded position.

14. The apparatus of claim 10, wherein the horizontally extending mounting plate and the vertically extending mounting plate each include an angled front edge and the first and second handle slots are positioned near the angled front edges.

15. The apparatus of claim 1, wherein the one more ladder engagement protrusions includes two nub-like protrusions spaced from each other for engaging the lower ladder rung.

16. The apparatus of claim 1, wherein the mounting points each are threaded studs for tightening a mounting foot thereto.

17. The apparatus of claim 1, wherein the first and second rung engagement tabs are formed via plate bending.

18. The apparatus of claim 1, wherein the hinge is a piano hinge.

19. An apparatus for mounting an electronic device or mechanical device on a ladder, the apparatus comprising:
a horizontally extending mounting plate comprising:
a first electronic device or mechanical device mounting point, the first mounting point being a threaded stud;
three engagement bracket fastener slots extending parallel to each other longitudinally along the horizontally extending mounting plate and spaced equidistant from each other; and
a first rung engagement tab extending downward 72 degrees from horizontal for engaging a front side of a rung of the ladder, the first rung engagement tab including a laterally extending engagement bracket slot;
a horizontally extending engagement bracket including a horizontally extending portion and a second rung engagement tab extending downward 45 degrees from horizontal, the horizontally extending portion including three engagement bracket fasteners and being configured to be inserted into the laterally extending engagement bracket slot, the second rung engagement tab being configured to engage a back side of the rung of the ladder when the horizontally extending engagement bracket is secured to the horizontally extending mounting plate, the three engagement bracket fasteners being configured to be inserted through the three engagement bracket fastener slots of the horizontally extending mounting plate for securing the horizontally extending engagement bracket to the horizontally extending mounting plate;
a vertically extending mounting plate comprising:
a second electronic device or mechanical device mounting point, the second mounting point being a threaded stud; and
two ladder engagement protrusions spaced apart from each other for engaging a lower rung of the ladder; and
a hinge attached to the horizontally extending mounting plate and the vertically extending mounting plate such that the horizontally extending mounting plate and the vertically extending mounting plate may be pivoted with respect to each other so that the apparatus may be shifted between a deployed configuration and a folded configuration, the horizontally extending mounting plate being oriented approximately 90 degrees in relation to the vertically extending mounting plate and the apparatus being configured to be secured to the ladder in the deployed configuration such that the first engagement tab of the horizontally extending mounting plate engages the front side of the ladder rung, the second engagement tab of the horizontally extending engagement bracket engages the rear side of the ladder rung, and the ladder engagement protrusions engage the lower ladder rung, the vertically extending mounting plate and the horizontally extending mounting plate being oriented substantially parallel to each other in the folded configuration for compactly transporting or storing the apparatus.

20. An apparatus for mounting an electronic device or mechanical device on a ladder, the apparatus comprising:

a horizontally extending mounting plate comprising:
- a first mounting point positioned near a front corner of the horizontally extending mounting plate for mounting an electronic device or mechanical device thereto;
- one or more engagement bracket fastener slots extending longitudinally along the horizontally extending mounting plate; and
- a first rung engagement tab for engaging a front side of a rung of the ladder, the first rung engagement tab including a laterally extending engagement bracket slot;

a horizontally extending engagement bracket including a horizontally extending portion and a second rung engagement tab, the horizontally extending portion including one or more engagement bracket fasteners and being configured to be inserted into the laterally extending engagement bracket slot, the second rung engagement tab being configured to engage a back side of the ladder rung when the horizontally extending engagement bracket is secured to the horizontally extending mounting plate, the one or more engagement bracket fasteners being configured to be inserted through the one or more engagement bracket fastener slots of the horizontally extending mounting plate for securing the horizontally extending engagement bracket to the horizontally extending mounting plate;

a vertically extending mounting plate comprising:
- a second mounting point positioned near a front corner of the vertically extending mounting plate for mounting an electronic device or mechanical device thereto;
- one or more ladder engagement protrusions for engaging a lower rung of the ladder; and a hinge attached to the horizontally extending mounting plate and the vertically extending mounting plate such that the horizontally extending mounting plate and the vertically extending mounting plate may be pivoted with respect to each other so that the apparatus may be shifted between a deployed configuration and a folded configuration, the horizontally extending mounting plate being oriented approximately 90 degrees in relation to the horizontally extending mounting plate and the apparatus being configured to be secured to the ladder in the deployed configuration such that the first engagement tab of the horizontally extending mounting plate engages the front surface of the ladder rung, the second engagement tab of the horizontally extending engagement bracket engages the rear surface of the ladder rung, and the ladder engagement protrusions of the vertically extending mounting plate engage the lower ladder rung, the vertically extending mounting plate and the horizontally extending mounting plate being oriented substantially parallel to each other in the folded configuration for compactly transporting or storing the apparatus.

* * * * *

UNITED STATES PATENT AND TRADEMARK OFFICE
CERTIFICATE OF CORRECTION

PATENT NO. : 9,598,903 B2
APPLICATION NO. : 14/581400
DATED : March 21, 2017
INVENTOR(S) : Richard Dean Miller Page 1 of 1

It is certified that error appears in the above-identified patent and that said Letters Patent is hereby corrected as shown below:

In the Specification

Insert the following paragraph immediately above paragraph 1:
-- STATEMENT REGARDING FEDERALLY-SPONSORED RESEARCH OR DEVELOPMENT
This invention was made with government support under Contract No.: DE-NA0000622 awarded by the Department of Energy. The government has certain rights in the invention. --

Signed and Sealed this
Seventeenth Day of September, 2019

Andrei Iancu
*Director of the United States Patent and Trademark Office*